United States Patent [19]

Vu et al.

[11] Patent Number: 5,021,535

[45] Date of Patent: Jun. 4, 1991

[54] CASTOR OIL BASED POLYURETHANE FOR UNDERBODY COATINGS AND THE LIKE

[75] Inventors: Cung Vu, Columbia, Md.; Norman E. Blank, Heidelburg, Fed. Rep. of Germany

[73] Assignee: W. R. Grace & Co.-Conn., New York, N.Y.

[21] Appl. No.: 577,836

[22] Filed: Aug. 31, 1990

Related U.S. Application Data

[63] Continuation of Ser. No. 369,970, Jun. 22, 1989, abandoned, which is a continuation-in-part of Ser. No. 247,137, Sep. 21, 1988, abandoned, which is a continuation-in-part of Ser. No. 209,406, May 19, 1988, Pat. No. 4,877,829.

[51] Int. Cl.$^5$ .............................................. C08G 18/30
[52] U.S. Cl. ................................ 528/66; 252/182.22; 427/388.1; 427/388.3; 427/393; 428/423.1; 428/425.1; 428/425.5
[58] Field of Search ...................... 528/66; 252/182.22; 427/388.1, 388.3, 393; 428/423.1, 425.1, 425.5

[56] References Cited

U.S. PATENT DOCUMENTS

| 4,567,230 | 1/1986 | Meyer | 524/786 |
|---|---|---|---|
| 4,788,269 | 11/1988 | Vu et al. | 528/60 |
| 4,804,743 | 2/1989 | Vu et al. | 528/54 |
| 4,855,185 | 8/1989 | Vu et al. | 528/60 |
| 4,859,735 | 8/1989 | Vu et al. | 524/780 |
| 4,877,829 | 10/1989 | Vu et al. | 524/729 |

FOREIGN PATENT DOCUMENTS

88/102540.7 9/1988 European Pat. Off. .

*Primary Examiner*—Maurice J. Welsh
*Attorney, Agent, or Firm*—Charles A. Cross

[57] ABSTRACT

The component polyol/polyisocyanate composition useful in forming an abrasion resistant polyurethane automotive undercoating. The polyol component is unmodified castor oil or castor oil modified with cyclohexanone-formaldehyde condensate. The modified castor oil may be further modified by adding the reaction product of neopentyl glycol and adipic acid. The polyisocyanate component comprises an MDI-based mixture containing polyisocyanate prepolymers based on alkylene oxides.

32 Claims, No Drawings

CASTOR OIL BASED POLYURETHANE FOR UNDERBODY COATINGS AND THE LIKE

RELATED APPLICATIONS

This is a continuation of application Ser No. 369,970, filed June 22, 1989, now abandoned, which is a continuation-in-part of an application having Ser. No. 247,137, filed Sept. 21, 1988, Vu, now abandoned, which is a continuation-in-part of co-pending application having Ser. No. 209,406, now U.S. Pat. No. 4,877,829 Vu et al, which was filed May 19, 1988 Ser. No. 245,869, filed Sept. 16, 1988, by Vu, (now U.S. Pat. No. 4,859,735), is directed to castor oil based polyurethanes for use as bridge deck membranes and for related purposes. The contents of that application are incorporated herein by reference.

FIELD OF THE INVENTION

This invention relates to the field of polyurethane resins and coatings made therefrom, especially the field of resins and coatings which have utility as an automotive underbody coating.

BACKGROUND OF THE INVENTION

Two-component mixes for the preparation of polyurethane resins are well known. As a matter of fact, in an elemental sense, the first polyurethane resins were made by mixing two components, which is to say, by reacting together a polyol as one component and a diisocyanate as the other. This concept has become greatly refined and improved upon during the subsequent growth of the polyurethane resin industry. As a result, various two-component mixes have been reported. Two-component mixes are described, for example, in U.S. Pat. Nos. 4,410,597 and 4,101,473. Polyurethane coatings are known for use in the auto industry; see UK patent Application No. 2,147,910A, published May 22, 1985; and U.S. Pat. Nos. 4,554,188, 4,400,497, and 4,525,570. The use of dibutyl tin dilaurate and triethylene diamine catalysts is well known in the polyurethane art. See, e.g., U.S. Pat. No. 4,124,573.

Castor oil is known as a polyol reactant with diisocyanates to form polyurethanes. Ency. Pol. Sci. and Techn. 3, 25 (1965). An updated technical brochure entitled "Desmophen", available from Mobay Chemical Co., describes "Desmophen" ® as a "branched polyalcohol with ether and ester groups". The brochure discloses that Desmophen ® can be reacted with isocyanates (not defined) to make polyurethane coatings for various applications. Our analyses indicate that "Desmophen" as currently available contains castor oil, cyclohexanone formaldehyde condensate, and a small amount of toluene.

U.K. Patent No. 1,182,884, Gruber and Fehlbier (1970) describes treatment of castor oil with cyclohexanone formaldehyde condensate, thereby providing modified castor oil as used in this invention. Reaction of the modified castor oil with MDI to make a polyurethane resin is also disclosed.

SUMMARY OF THE INVENTION

An object of the invention involves reacting together two components, A and B, to make a novel polyurethane resin. Component A comprises castor oil, unmodified or modified as herein described. Component B comprises MDI-based polyisocyanates. Other objects will be evident from the following description.

DETAILED DESCRIPTION OF THE INVENTION

Component A

The primary ingredient in Component A is castor oil, used as such (unmodified) or modified in either of two specific ways. In one modification (Modification No. 1), the castor oil contains a small amount (e.g., 2–3 weight %) of cyclohexanone-formaldehyde condensate as described in U.K. Patent No. 1,182,884, above cited. In the second modification (Modification No. 2), a polyester polyol made by reacting neopentyl glycol and adipic acid is added to the castor oil produced in Modification No. 1 in an amount of about 30 parts polyester polyol to 70 parts Modification No. 1. Modification No. 2 is considered novel per se.

Component A suitably includes a catalyst system plus inert ingredients that do not affect the subsequent polymerization. To prepare Component A, the castor oil (unmodified or modified) and the catalysts, together with any inert material (fillers, thixotropic agents, etc.), are simply mixed together in a pot. The catalysts will be described in a later Section.

Component B

Component B comprises:

(a) diphenylmethane diisocyanate (MDI) plus a polyisocyanate prepolymer made by reacting together MDI with a poly(oxypropylene) glycol to produce a compound of the formula:

wherein
K is

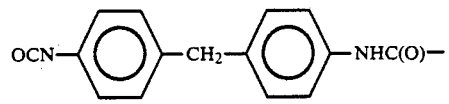

and
m is about 2–5,
or (b) a mixture of (a) with a polyisocyanate mixture (c) containing MDI and a polyisocyanate prepolymer of the formula

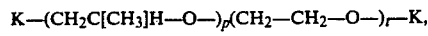

wherein
K is

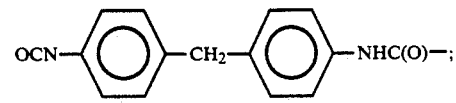

p is about 50; and
t is in the range of about 18–20

The above materials (a) and (c) are modified MDI's and may be so referred to herein. These modified MDI's will now be described in more detail.

With reference to (a) above, modified MDI can be made by reacting together diphenylmethane 4,4'- or 2,4'-diisocyanate (MDI) with a poly(oxypropylene) glycol of the formula:

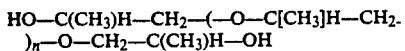

The value for n lies approximately, between 0 and 3, indicating that the material is a mixture, probably with small amounts of higher and lower molecular weight polymers of the same genus. In the main reaction, the MDI end caps both ends of the poly(oxypropylene) glycol. The prepolymer thus formed may also contain small amounts of other products of the reaction which contain isocyanate and/or hydroxyl groups. The resulting prepolymer has the formula described in (a) supra. In general, this material may be described as an MDI/-polyisocyanate material comprising about 45–50 weight % MDI with the balance being the above described polypropylene prepolymer, i.e., with some prepolymer molecules being relatively small and others larger (depending generally on the amount of capped polyoxypropylene), but with the averages being substantially as above enumerated.

Instead of poly(oxypropylene)glycol, oxyethylene and oxybutylene glycols can be used with similar results.

The above mentioned polyisocyanate (c) is made in similar fashion; it may contain up to 20% unreacted MDI. As noted, polyisocyanate (b) is a mixture of (a) and (c).

Whereas MDI is a solid, and is very difficult to handle in spray apparatus, the above described MDI/-polyisocyanates (a) and (b) are homogeneous liquids and are readily sprayed.

Prepolymer polyisocyanates of the type described in (a) above are available as Mondur XP-744 (Mobay), Isonate 181 (Dow Chemical Co.) etc. Polyisocyanate (c) is available as Mondur XP-743 (Mobay). However, polyisocyanate (b) above is considered novel per se.

The weight ratio of Component A:Component B can vary.

The Catalyst

The preferred catalyst is equal weights of dibutyl tin dilaurate (DBTDL) with triethylenediamine (DABCO). However, substantially any of the conventional polyurethane catalysts (and combinations thereof) can be used.

These catalysts include:

Tertiary amines:
Triethylene diamine
N-methyl morpholine
N-ethyl morpholine
Diethyl ethanolamine
N-coco morpholine
1-methyl-4-dimethylamino ethyl piperazine
3-methoxy-N-dimethyl propyl amine
N-dimethyl-N'-methyl isopropyl propylene diamine
N,N-diethyl-3-diethyl amino propylamine
N,N-dimethyl benzyl amine
Dicyclohexylmethylamine
2,4,6-tris dimethylaminomethylphenol
N,N-dimethyl cyclohexylamine
Triethylamine
Tri-n-butylamine
1,8-diaza-bichloro[5,4,O]-undecene-7
N-methyl diethanolamine
N,N-dimethyl ethanolamine
N,N-diethyl cyclohexylamine
N,N,N'N'-tetramethyl-ethylene diamine
1,4-diaza-bicyclo-[2,2,2]-octane
N-methyl-N'-dimethylaminoethyl-piperazine
Bis-(N,N-diethylaminoethyl)-adipate
N,N-diethylbenzylamine
Pentamethyldiethylene triamine
N,N,N',N'-tetramethyl-1,3-butanediamine
1,2-dimethylimidazole
2-methylimidazole
Tin compounds:
Stannous chloride
Dibutyl tin di-2-ethyl hexoate
Stannous octoate
Dibutyl tin dilaurate
Trimethyl tin hydroxide
Dimethyl tin dichloride
Dibutyl tin diacetate
Dibutyl tin oxide
Tributyl tin acetate
Tetramethyl tin
Dimethyl dioctyl tin
Tin ethyl hexoate
Tin laurate
Dibutyl tin maleate
Dioctyl tin diacetate
Other metal organics:
Zinc octoate
Phenyl mercuric propionate
Lead octoate
Lead naphthenate
Copper naphthenate As to the amount of catalysts(s), the preferred amount of tertiary amine catalyst is about 0.01 to 3.0%, based on the total weight of castor oil (unmodified or modified) plus polyisocyanate. When using a tin compound or other metal-containing catalyst, an equal amount is suitable. Mixtures of tertiary amines and organo-metallics are particularly suitable as catalysts for this invention.

When curing periods extending over several hours are acceptable, the catalyst may be omitted altogether.

Mixing Components A and B—Application to Substrate

For small batches, A and B can be mixed in an open container at room temperature. Reaction occurs very quickly, forming the desired polyurethane resin, which can then be spread on a substrate by using a paint brush, roller or like applicator. In production work for which the resin is designed, a conventional two-liquid air spray gun gives the best results.

Application is suitably made at room temperature. The resin can be applied at higher temperatures, if desired, e.g., 80°–100° F. The coated article is tack-free within a time ranging from minutes to hours, depending on the amount of catalyst and cures at room temperature without being heated. However, it is not harmed by subsequent conventional baking steps that may occur in an auto assembly line.

When testing the coatings, a mixture of Component A and Component B was coated on 4"×12" steel panels that had been electrocoated with a conventional primer composition (an "E" coat), e.g., a composition which is commercially available from PPG Industries under the tradenames "3150" or "3150A". The claimed coatings were fully cured at room temperature prior to testing.

Additives

Various conventional materials which are inert to the formation of the polyurethane resin from the two Components A and B can be added, e.g., thixotropic agents such as fumed silica, anti-oxidants, antiblistering agents, reinforcing agents (fibers, platelets, crosslinkers, latexes, etc.), thickeners, plasticizers, UV stabilizers, pigments and extenders such as silica, barytes, carbon black, titanium dioxide (and the like), pigment dispersants, corrosion inhibitors, etc. These materials can be added to A, to B, or the mixture of A and B, in amounts ranging from about 0.01 to 25.0% by weight of the total mixture.

The Substrate

Although the novel polyurethane resin of the invention is designed primarily for the automotive industry as an undercoating for steel frames, rocker panels, wheel wells, etc., the resin is also a useful coating for nonferrous articles (Al, Cu, Mg), wood, fabrics, concrete, plastics, rubber, glass, ceramics, fiber, paper and the like. The resin of the invention is also useful as an undercoating for rail equipment (locomotives, coaches, freight cars, street cars, subway cars, etc.), buses, ships and farm equipment. It is particularly useful in coating substrates exposed to salt and marine environments. Such substrates include steel structures for highways and bridges exposed to road salt, as well as interior and exterior steel surfaces on ships and other structures on or near oceans or inland salt lakes. It can be used as a primer, an intermediate coating or as a final coating. It is also paintable; i.e., after curing, it can be painted with conventional paints.

As mentioned, a particularly useful application is as an automotive undercoating. In view of the commercial importance of this use, some requirements currently in demand in the automobile industry are listed below.

The resin system should
(1) be solventless;
(2) be readily sprayable, at room temperature or at elevated temperatures;
(3) provide a tack-free coating within a few minutes, e.g., dry to touch within 30 minutes;
(4) provide a fully cured coating within 24 hours;
(5) provide a coating with excellent adhesion;
(6) provide a coating with excellent abrasion resistance;
(7) provide a coating with no sag at a minimum of 10 mils dry; and
(8) provide a coating that is stable through the paint oven conditions.

The invention meets the above criteria in all essential respects.

The following examples merely illustrate the claimed invention and are not intended to limit the scope of the claims reciting such invention.

EXAMPLE 1

| Component A | |
|---|---|
| Castor oil | 340 g |
| Component B | |
| Polyisocyanate Mixture (XP-744) (b)[a] | 179 g |

[a]Polyisocyanate (a) and Polyisocyanate (c) described supra.

Component A was mixed with B, with the resulting polyurethane resin product being coated on panels. The coating became tack-free within hours. (If a catalyst is used, its product becomes tack free within minutes.) The dry German Sablux abrasion result (test description below) was 12.1 mils/251 secs. The peel strength results were excellent.

EXAMPLE 2

| Component A | 680 g. |
|---|---|
| Castor oil, Modification No. 1 described supra | |
| Component B | 704 g. |
| Polyisocyanate (b), a mixture of 179 g Polyisocyanate (a), and 525 g Polyisocyanate (c). | |

The preferred weight ratio of polyisocyanate (a) to polyisocyanate (c) is about 1:3.

The polyurethane resin obtained by mixing Components A and B together was coated on panels and became tack-free after 1 day. The Sablux abrasion test result for this material was 12.6 mils/400 secs. The peel strength was excellent.

EXAMPLE 3

| | Parts by Weight |
|---|---|
| Component A | |
| Castor Oil Modification No. 2[a] | 94 |
| Additives | |
| DT | 1 |
| Desmondur E22 | 4 |
| Carbon pigment | 0.05 |
| TiO$_2$ pigment | 0.9 |
| Fumed silica, thixotropic agent | 0.05 |
| | 100.00 |
| Component B | |
| Polyisocyanate (b), Polyisocyanate (a) and Polyisocyante (c) described supra to make | 100.00 |
| total parts of A and B | 200.00 |

[a]Includes neopentyl glycol-adipic reaction product; see description above.

The above formulation is particularly useful as an auto underbody coating.

The polyurethane resin of Example 3 was coated on panels and tested for abrasion by the Sablux procedure. Results are given in the following table.

TABLE 1

| Sablux Abrasion Results | |
|---|---|
| Coating thickness (microns) | Time to break (seconds) |
| 150 | 17 |
| 400 | 224 |
| 460 | 311 |
| 650 | 639 |

Sablux Abrasion Test

The coatings are tested for abrasion resistance in both the dry and wet state by the well known Sablux procedure. The wet coatings to be tested are soaked in a water bath for 24 hours prior to abrasion testing. The test is the same for both the dry and wet panels. The test consists of shot blasting the urethane polymer coated panel (positioned horizontally) with a crushed spherical cast steel shot type GP-14 Wheelabrator-Allevard at an air pressure of 35 psi at an angle of 60° until full penetration of the coating to expose bare steel is visibly noted. For dry or wet sample of 15-mil thickness, a blasting period in excess of 200 seconds is considered commercially acceptable. The actual results are rarely exactly 15 mils or 200 seconds, but are readily extrapolated to these criteria. Thus, in Example 2, where a coating of 12.6 mils endured to 400 seconds, this is equivalent to $(200 \times 12.6)/400 = 6.3$ mils for 200 seconds or $(15 \times 400)12.6 = 15$ mils for 476 seconds. Similar conversions can be made for the data in Example 3.

Peel Test (Adhesion)

This test was used for the coatings. A strip of brass screen (0.020 mesh), 1"×10", is taped to both ends of electrocoated steel panels (1"×5") leaving an excess of screen at one end. The mixes of Components A and B from the Examples were each applied to a separate panel through the screen to mesh with the panel substrate and then allowed to cure. After curing, the tape was removed from the end with the excess screen, allowing it to be peeled at 180° from the panel. The adhesion is measured for these coatings in pounds per linear inch (pli).

We claim:

1. A polyisocyanate mixture comprising
(i) a mixture of about 50–55% by weight a prepolymer of the formula

wherein
K is

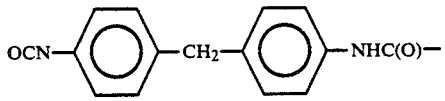

and
m is about 2–5;
and about 45–50% by weight a diphenylmethane diisocyanate from the group consisting of diphenylmethane-4,4'-diisocyanate, diphenylmethane-4,2'-diisocyanate, and diphenylmethane-2,4'-diisocyanate; and
(ii) a polyisocyanate of the formula

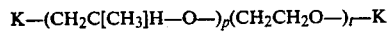

wherein
K is

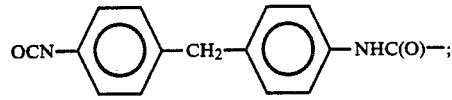

p is about 50; and
t is in the range of about 18–20;
and up to about 20% by weight a diphenylmethane diisocyanate from the group consisting of diphenylmethane-4,4'-diisocyanate, diphenylmethane-4,2'-diisocyanate, and diphenylmethane-2,4'-diisocyanate.

2. A polyisocyanate mixture according to claim 1 wherein a ratio of (i):(ii) is about 1:3.

3. Composition comprising two separate components, A and B, wherein Component A is a member of the group consisting of
(a) unmodified castor oil,
(b) castor oil containing about 2–3% by weight a cyclohexanone-formaldehyde condensate, and
(c) a mixture of about 70% by weight (b) and about 30% by weight a polyester polyol reaction product from neopentyl glycol and adipic acid; and
Component B is a member of the group consisting of
(d) a mixture of about 50–55% by weight
(i) a prepolymer of the formula

wherein
K is

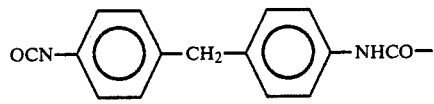

and
m is about 2–5;
and
about 45–50% by weight
(ii) a diphenylmethane diisocyanate from the group consisting of diphenylmethane-4,4'-diisocyanate, diphenylmethane-4,2'-diisocyanate, and diphenylmethane-2,4'-diisocyanate;
(e) a mixture of a prepolymer having the formula:

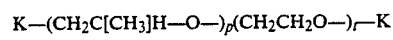

wherein
K is as above defined in (d)(i),
p is about 50; and
t is in the range of about 18–20;
and up to about 20% by weight a diphenylmethane diisocyanate from the group consisting of diphenylmethane-4,4'-diisocyanate, diphenylmethane-4,2'-diisocyanate and diphenylmethane-2,4'-diisocyanate; and
(f) a mixture of (d) and (e).

4. Composition according to claim 3 wherein Component A consists essentially of unmodified castor oil.

5. Composition according to claim 3 wherein Component A is castor oil containing about 2–3 weight % a cyclohexanone-formaldehyde condensate.

6. Composition according to claim 3 wherein Component A comprises a mixture of about 70% by weight castor oil containing about 2–3% by weight a cyclohexanone-formaldehyde condensate and 30% by weight a polyester polyol reaction product from neopentyl glycol and adipic acid.

7. Composition according to claim 3 wherein Component B comprises mixture (d).

8. Composition according to claim 3 wherein Component B comprises polyisocyanate mixture (f).

9. Composition according to claim 3 wherein Component B comprises mixture (e).

10. Composition according to claim 3 wherein said composition contains at least one additive selected from the group consisting of thixotropic agents, anti-oxidants, antiblistering agents, reinforcing agents, thickeners, plasticizers, UV stabilizers, pigments, extenders, pigment dispersants, and corrosion inhibitors in amounts ranging from about 0.01 to 25.0% by weight of the total composition.

11. Polyurethane resin obtained by reacting Component A with Component B wherein Component A is a member of the group consisting of
   (a) unmodified castor oil,
   (b) castor oil containing about 2–3% by weight a cyclohexanone-formaldehyde condensate, and
   (c) a mixture of about 70% by weight (b) and about 30% by weight a polyester polyol reaction product from neopentyl glycol and adipic acid; and
Component B is a member of the group consisting of
   (d) a mixture of about 50–55% by weight
      (i) a prepolymer of the formula K—O—(CH$_2$CH[CH$_3$]O)$_m$—K, wherein
   K is

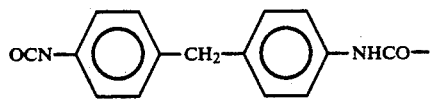

and
   m is about 2–5,
   and
   about 45–50% by weight
      (ii) a diphenylmethane diisocyanate from the group consisting of diphenylmethane-4,4'-diisocyanate, diphenylmethane-4,2'-diisocyanate, and diphenylmethane-2,4'-diisocyanate;
   (e) a mixture of a prepolymer having the formula:

K—(CH$_2$C[CH$_3$]H—O—)$_p$(CH$_2$CH$_2$O—)$_t$—K wherein
   K is as above defined in (d) (i),
   p is about 50; and
   t is in the range of about 18–20;
   and up to about 20% by weight a diphenylmethane diisocyanate from the group consisting of diphenylmethane-4,4'-diisocyanate, diphenylmethane-4,2'-diisocyanate and diphenylmethane-2,4'-diisocyanate and
   (f) a mixture of (d) and (e).

12. Polyurethane resin according to claim 11 wherein Component A comprises castor oil containing about 2–3% by weight cyclohexanone-formaldehyde condensate and Component B comprises polyisocyanate mixture (f).

13. Polyurethane resin according to claim 12 wherein the weight ratio of Component A:Component B is about 1:1.

14. Polyurethane resin according to claim 11 wherein Component A comprises a mixture of about 70% by weight castor oil containing about 2–3% by weight cyclohexanone-formaldehyde condensate and about 30% by weight of a polyester polyol reaction product from neopentyl glycol and adipic acid, and Component B comprises polyisocyanate mixture (f).

15. Polyurethane resin according to claim 14 wherein the weight ratio of Component A:Component B is about 1:1.

16. Process of forming a polyurethane resin comprising mixing together Component A with Component B, both components being as defined in claim 3.

17. Process according to claim 16 wherein Component A is castor oil containing about 2–3% by weight cyclohexanone-formaldehyde condensate and Component B is a polyisocyanate mixture as defined by polyisocyanate mixture (f) recited in claim 3.

18. The process of coating a substrate comprising applying thereto the resin of claim 11.

19. Process according to claim 18 wherein the resin is that of claim 12.

20. Process according to claim 18 wherein the resin is that of claim 14.

21. Coated article comprising a substrate and a coating adhered thereon, said coating comprising the resin of claim 11.

22. Article according to claim 21 wherein the resin is that of claim 12.

23. Article according to claim 21 wherein the resin is that of claim 14.

24. Article according to claim 21 wherein the substrate is a member of the group consisting of metal, wood, concrete, plastic, rubber, glass, ceramic, and fabric.

25. Article according to claim 24 wherein the substrate is an automotive body part.

26. Article according to claim 25 wherein the automotive body part is steel.

27. Method of protecting automotive body parts against abrasion comprising coating said body parts with the resin of claim 11.

28. Method according to claim 27 wherein the resin is that of claim 12.

29. Method according to claim 27 wherein the resin is that of claim 14.

30. Process according to claim 16 wherein Component A comprises a mixture of about 70% by weight castor oil containing about 2–3% by weight cyclohexanone-formaldehyde condensate and about 30% by weight of a polyester polyol reaction product from neopentyl glycol and adipic acid, and Component B comprises a polyisocyanate mixture as defined by mixture (f) in claim 3.

31. A process according to claim 30, wherein 100 parts Component A is mixed with 100 parts Component B, wherein Component A in addition comprises about 6% by weight additives and Component B comprises 179 g of mixture (d) as defined in claim 3 and 525 g of mixture (e) as defined in claim 3.

32. A process according to claim 17 wherein 680 g of Component A is mixed with 704 g of Component B wherein Component B comprises 179 g of mixture (d) as defined in claim 3 and 525 g of mixture (e) as defined in claim 3.

* * * * *